UNITED STATES PATENT OFFICE

2,269,450
N-(ALPHA-BETA-ALKENYLIDENE) AMINOPHENOLS

Howard M. Fitch, Wilmington, Del., assignor to E. I. du Pont de Nemours & Company, Wilmington, Del., a corporation of Delaware No Drawing. Original application December 15, 1938, Serial No. 245,911. Divided and this application October 26, 1940, Serial No. 363,017

8 Claims. (Cl. 260—566)

This invention relates to new N-(alpha-beta-alkenylidene)-aminophenols.

Many attempts have been made to produce N-alkylidene aminophenols by condensing normal aliphatic aldehydes, such as acetaldehyde and n-butyl aldehyde, with primary aminophenols. These processes have not proved to be commercially successful for the reason that the reaction products are usually amorphous or tarry products of indefinite constitution which behave as polymerization products and show few, if any, of the properties of N-alkylidene aminophenols. They apparently consist primarily of polymerized condensation products rather than the simple alkylidene aminophenols. They do not reduce cleanly to N-alkyl aminophenols. Any alkylidene aminophenol, as thus produced, is quite unstable and readily polymerizes or hydrolyzes rapidly, rendering it extremely difficult, if not impossible, to isolate the alkylidene aminophenol. Accordingly, it has not been practicable to prepare N-alkyl aminophenols by condensing an aliphatic aldehyde with an aminophenol and then reducing to the N-alkyl aminophenols.

An object of my invention is to provide a new class of N-(alpha-beta-alkenylidene)-aminophenols which are more stable than alkylidene aminophenols which have been known heretofore. A still further object is to provide a method for producing new and more stable N-alkylidene aminophenols and for producing N-alkyl aminophenols therefrom. Other objects are to provide new compositions of matter and to advance the art. Still other objects will appear hereinafter.

Objects of my invention may be accomplished by condensing an alpha-beta-alkenyl aldehyde with a primary aminophenol whereby an N-(alpha-beta-alkenylidene)-aminophenol is obtained. The alpha-beta-alkenyl aldehydes are those in which the alpha and beta carbon atoms are doubly bonded together and correspond to the formula

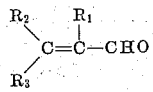

wherein $R_1$, $R_2$ and $R_3$ each represents hydrogen or an alkyl group. The N-(alpha-beta-alkenylidene)-aminophenols will then correspond to the formula

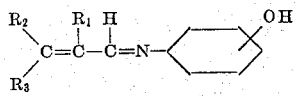

wherein $R_1$, $R_2$ and $R_3$ each represents hydrogen or an alkyl radical.

The resulting N-(alpha-beta-alkenylidene)-aminophenols are new chemical compounds, not known heretofore, and are more stable than other alkylidene aminophenols heretofore known. These new N-(alpha-beta-alkenylidene)-amino- phenols are sufficiently stable so that they can be stored for long periods of time, even in the presence of the atmosphere and water vapor.

While it would be expected that the alkenyl aldehydes would polymerize more rapidly and to a greater extent than the normal saturated aldehydes and that the alkenylidene aminophenols would also polymerize more readily and to a greater extent than the saturated alkylidene aminophenols, I have found that the alkenyl aldehydes condense with the aminophenols with practically no polymerization of either the aldehyde or the resulting alkenylidene aminophenol.

Upon hydrogenation of the N-(alpha-beta-alkenylidene)-aminophenols in accordance with my invention, both the alpha-beta double bond and the —CH=N— linkage become saturated, and N-alkyl-aminophenols, in which the alkyl groups are saturated, are formed. Since these N-(alpha-beta-alkenylidene)-aminophenols are stable, it is not necessary to hydrogenate them to the N-alkyl aminophenols simultaneously with their formation, but they may be isolated and subsequently hydrogenated, and high yields of relatively pure N-alkyl aminophenols will still be obtained.

By the term "primary aminophenols," I mean aromatic compounds containing both a hydroxyl and a primary amino group attached to ring carbon atoms of the same aromatic nucleus, and include compounds in which the aromatic ring is of the benzene, naphthalene, anthracene or higher aromatic series. These aminophenols may contain, as substituents, alkyl, aryl, aralkyl, alkoxy, aralkoxy, aryloxy, halogen and additional hydroxyl and amino groups, but are preferably devoid of reducible substituents. Preferably, I employ aminophenols of the benzene series. I also prefer aminophenols in which the substituents are restricted to alkyl substituents, in other words, the unsubstituted and alkyl substituted aminophenols. Further, the ortho and para aminophenols appear to be the most useful.

Among the aldehydes which I have found to be particularly satisfactory in my process are:

Acrolein
Crotonaldehyde
1-methyl acrolein
1-ethyl-2-propyl acrolein
Alpha-beta hexenic aldehyde When such aldehydes are condensed with para-aminophenol, for example, the following compounds are formed:

N-acrylal-p-aminophenol
N-crotonal-p-aminophenol
N-(1-methyl acrylal)-p-aminophenol
N-(1-ethyl-2 propyl acrylal)-p-aminophenol
N-(alpha-beta hexenal)-p-aminophenol In carrying out the reaction, it is preferable to employ a slight excess of aldehyde and preferably from 1.1 to 1.2 moles are used for each mole of aminophenol. It will be found practical to use from about 1 to about 1.5 moles of aldehyde to each mole of aminophenol. By "a substantially equimolecular proportion" of an aldehyde, as hereinafter employed, I mean from about 1 to about 1.5 moles for each mole of aminophenol. Larger or smaller amounts of aldehyde may be used, but without substantial advantage. A lesser amount of aldehyde will necessarily leave unreacted aminophenol to be separated from the desired product. Larger amounts of aldehyde provide an unnecessary excess of aldehyde, most of which is reduced to the corresponding alcohol during the hydrogenation.

Further improvements in accordance with my invention result from the use, as solvents, particularly in the hydrogenation step, of polar solvents and aliphatic hydrocarbons. By the term "polar solvents," I mean solvents selected from the aliphatic alcohols, aliphatic esters, aliphatic ethers, aliphatic ketones, alcohol ethers, halogenated aliphatic hydrocarbons, water and mixtures of two or more thereof, and particularly mixtures of such polar solvents, other than water, with substantial amounts of water. A substantial amount of water will be at least 0.5%.

In order to illustrate my invention more clearly, the preferred modes of carrying the same into effect, and the advantageous results to be obtained thereby, the following examples are given, in which the parts are by weight, except where specifically indicated otherwise.

EXAMPLE 1.—*N-crotonal-p-aminophenol*

77 parts of crotonaldehyde was rapidly added with stirring to 109 parts of p-aminophenol suspended in 500 parts by volume of 50% alcohol at 33° C. The temperature of the reaction mixture increased to 47° C., the p-aminophenol dissolved, and a precipitate promptly formed. The reaction mixture was then cooled and filtered. The precipitate was washed with 100 parts by volume of 50% alcohol and then with 300 parts by volume of ether, after which it was dried at room temperature in a slow stream of air.

The product was 136 parts of N-crotonal-p-aminophenol as salmon-pink crystals, which melted at 140–142° C. with decomposition and contained 8.68% N. The theory for $C_{10}H_{11}ON$ is 8.69% N. The product has the formula

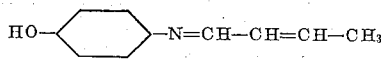

It may be stored in air at room temperature for long periods of time without appreciable alteration.

The identity of the product was confirmed by reduction to N-(n-butyl)-p-aminophenol. 100 parts of N-crotonal-p-aminophenol, prepared as described above, 20 parts of an active nickel-on-kieselguhr catalyst and 100 parts by volume of toluene were shaken at 125 to 135° C. under 400 to 500 lbs./sq. in. hydrogen pressure until no more hydrogen was absorbed. The charge was then cooled and filtered from catalyst and some insoluble material. The filtrate was freed of solvent by distillation under reduced pressure, and the residue was distilled in vacuo. The product was 34 parts of N-(n-butyl)-p-aminophenol as a yellow oil, B. P. 160–170° C. at 0.5 mm. pressure, containing 8.06% N. The theory for $C_{10}H_{15}ON$ is 8.48% N.

While, in the above examples, I have disclosed the products made from p-aminophenol, it will be understood that other aminophenols, such as ortho-aminophenol, the aminocresols, the aminonaphthols and the like, may be employed in place of the p-aminophenol to obtain the corresponding N-(alpha-beta-alkenylidene) aminophenols, aminocresols, aminonaphthols and the like.

The new N-(alpha-beta-alkenylidene)-aminophenols of my invention have many uses, among which may be mentioned their use in gasoline, rubber, fats, oils, waxes, and motor fuels, such as cracked gasoline, containing anti-knock agents, such as tetraethyl lead, and similar substances to retard or inhibit gum formation and oxidation and to improve their stability. They may also be employed as intermediates in the production of dyestuffs and pharmaceutical chemicals.

While I have disclosed the preferred embodiments of my invention and the preferred modes of carrying the same into effect, it will be readily apparent to those skilled in the art that many variations and modifications may be made therein without departing from the spirit of my invention. Accordingly, the scope of my invention is to be limited solely by the appended claims construed as broadly as is permissible in view of the prior art.

This is a division of my co-pending application for "Aminophenols and their preparation" filed December 15, 1938, as Serial Number 245,911.

I claim:

1. An N-(alpha-beta-alkenylidene)-aminophenol.
2. An N-(alpha-beta-alkenylidene)-aminophenol of the benzene series.
3. An N-(alpha-beta-alkenylidene-p-aminophenol of the benzene series.
4. An N-(alpha-beta-alkenylidene)-p-aminophenol of the benzene series in which the alkenylidene radical contains from 3 to 4 carbon atoms.
5. N-crotonal-p-aminophenol.
6. An N-acrylal-p-aminophenol.
7. N-acrylal-p-aminophenol.
8. N-(1-methyl acrylal)-p-aminophenol.

HOWARD M. FITCH.